United States Patent Office 3,159,662
Patented Dec. 1, 1964

3,159,662
ADDITION REACTION
Bruce A. Ashby, Schenectady, N.Y., assignor to General Electric Company, a corporation of New York
No Drawing. Filed July 2, 1962, Ser. No. 207,059
5 Claims. (Cl. 260—448.2)

This invention relates to an improved process for the addition reaction between a compound containing a silicon-bonded hydrogen atom and a compound containing aliphatic unsaturation whereby a new silicon-carbon linkage is formed.

Addition reactions between compounds containing silicon-hydrogen linkages and compounds containing aliphatic unsaturation are well known in the art and provide a means of forming a wide variety of products. These addition reactions can be employed to form monomeric materials or polymeric materials which are useful, respectively, as intermediates in the preparation of more complicated products and which are useful per se as coating materials, elastomers and insulating materials. These addition reactions are generally effected in the presence of a catalyst. Thus, such reactions are shown in Patent 2,970,150—Bailey, wherein a platinum catalyst is employed and in Patent 2,823,218—Speier et al., wherein a chloroplatinic acid is employed as a catalyst. The addition reaction can be effected with an unsaturated compound containing either an olefinic double bond or an acetylenic triple bond. The reaction is illustrated with respect to an olefinic double bond as follows:

(1) 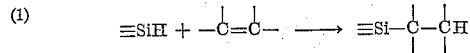

While the prior art catalyzed systems for these addition reactions are useful in many types of reactions, the prior art materials suffer certain disadvantages. The prior art materials are often poisoned by materials with which they are in contact, which may be one of more of the reactants or which may be one or more of the materials in contact with the reaction mixture.

It is an object of the present invention to provide an improved process for the reaction of a silicon compound containing a silicon-hydrogen linkage with a second material containing an aliphatic double bond or an aliphatic triple bond without the disadvantages inherent in the prior art processes.

This and other objects of my invention are accomplished by conducting the addition reaction described above in the presence of a platinum-cyclopropane complex having the formula:

(2)                 $(PtCl_2 \cdot C_3H_6)_2$

By the practice of the process of the present invention, organosilicon compounds containing silicon-hydrogen linkages can be reacted with other compounds containing olefinic or acetylenic unsaturation to provide new silicon-carbon bonds without the disadvantages inherent in the prior art materials. Thus, the process of the present invention is not as readily subject to "poisoning" as prior art processes and the platinum-cyclopropane complex may be more readily incorporated into the reaction mixture because of its solubility in various organosilicon materials as well as its solubility in various hydrocarbon solvents.

The platinum-cyclopropane complex of Formula 2 is a light yellow powder and is known in the art. For example, this complex of Formula 2 is shown by C. F. H. Tipper, J. Chem. Soc. 2045-6 (1955). The platinum-cyclopropane complex can be prepared by several methods. One of the methods is that shown by Tipper, which involves the reaction between cyclopropane and chloroplatinic acid. Another method of forming the complex of Formula 2 is by effecting reaction between a platinum-ethylene complex having the formula:

(3)                 $(PtCl_2 \cdot C_2H_4)_2$ and cyclopropane. The platinum-ethylene complex of Formula 3 is also well known in the art and described, for example, by R. N. Keller, Chemical Reviews, 1940-41, 27-28, pages 229-267, and by Joy and Orchin, Journal of the American Chemical Society, 81, pages 305-311 (1959).

The platinum-cyclopropane complex catalyst of the present invention is operative for the addition of an unlimited class of silicon compounds containing a silicon-hydrogen linkage to an unlimited class of organic compounds containing a pair of aliphatic carbon atoms linked by multiple bonds, as illustrated, for example, in Formula 1.

As an illustration of the addition reactions in which the platinum-cyclopropane complex catalyst of the present invention are operative, reference is made to Patent 2,823,218—Speier et al. The catalyst of the present invention is operative for every one of the addition reactions described in the aforementioned reaction. As a further illustration of reactions in which the catalyst of the present invention is applicable, reference is made to Patent 2,970,150—Bailey. The catalyst of the present invention is also applicable to every one of the reactions illustrated in this Bailey patent.

The organosilicon reactant containing the silicon-hydrogen linkage can be inorganic or organic and can be monomeric or polymeric. The only requirement of the silicon-hydrogen-containing reactant is that the reactant contain at least one silicon-bonded hydrogen atom per molecule, with no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisilane, etc.

Among the monomeric silicon compounds and organosilicon compounds containing silicon-hydrogen linkages which are operable in the practice of the present invention are those having the formula:

(4)                 $(R)_a Si(H)_b (X)_{4-a-b}$ where X is a member selected from the class consisting of halogen, —OR radicals, and —OOCR radicals, R can be any organic radical, but preferably is a member selected from the class consisting of monovalent hydrocarbon radicals, halogenated monovalent hydrocarbon radicals and cyanoalkyl radicals, $a$ has a value of from 0 to 3, inclusive, $b$ has a value of from 1 to 2, inclusive, and the sum of $a$ plus $b$ is from 1 to 4, inclusive. Where more than one R radical is present in a compound within the scope of Formula 4, the various R radicals can differ from each other. Among the radicals represented by R can be mentioned, for example, alkyl radicals, e.g., methyl, ethyl, propyl, octyl, octadecyl, etc. radicals; cycloalkyl radicals such as, for example, cyclohexyl, cycloheptyl, etc. radicals; aryl radicals, e.g., phenyl, naphthyl, tolyl, xylyl, etc. radicals; aralkyl radicals, e.g., benzyl, phenyl ethyl, etc. radicals; and haloaryl and haloalkyl radicals, e.g., chloromethyl, chlorophenyl, dibromophenyl, etc. radicals. In the preferred embodiment of my invention, the R radical is methyl or a mixture of methyl and phenyl. In addition to the radicals mentioned above, the R radical can also be an unsaturated aliphatic radical such a vinyl, allyl, cyclohexenyl, etc. When the R radical is a radical with aliphatic unsaturation, it is possible to react the silicon compound containing silicon-hydrogen linkages with itself.

Among the specific type of monomeric silicon compounds and organic silicon compounds within the scope of Formula 4 are those having the formula:

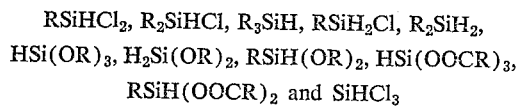

RSiH(OOCR)$_2$ and SiHCl$_3$ where R is as previously defined.

Among the silicon-hydrogen containing compounds useful in the practice of the present invention are those in which each molecule contains more than one silicon atom. Within this category are included organopolysilanes, organopolysiloxanes and various polysilalkalene compounds containing, for example, a —SiCH$_2$Si— grouping or a —SiCH$_2$CH$_2$Si— grouping and polysilphenylene materials which contain the —SiC$_6$H$_4$Si— grouping and the organosilazanes which are characterized by an Si—N—Si linkage in the polymer structure. Among the structurally uncomplicated silicon-hydrogen compounds containing more than one silicon atom are materials having the formulae:

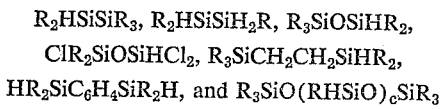

where R is as previously defined and c is an integer, for example, an integer equal to from 1 to 10,000 or more.

Among the organopolysiloxanes operable in the practice of the present invention are polymers and copolymers containing up to one or more of the units having the formula:

along with at least one unit per molecule having the formula:

where R is as previously defined.

While any of the silicon-hydrogen compounds described above are operative in the practice of the present invention, it is preferred that the silicon-hydrogen compound be an organopolysiloxane such as an organocyclopolysiloxane having the formula:

(5)                              (RHSiO)$_d$ or an organopolysiloxane polymer or copolymer having the formula:

(6)                           (R)$_e$Si(H)$_f$O$_{4-e-f}$ where R is as previously defined, d is as previously defined, e has a value of from 0.5 to 2.49, f has a value of from 0.001 to 1.0 and the sum of e plus f is equal to from 1.0 to 2.5. Organopolysiloxanes within the scope of formulae 5 and 6 are well known in the art and are prepared, for example, by the hydrolysis and condensation of various organochlorosilanes. Thus, where R is methyl, cyclopolysiloxanes within the scope of Formula 5 can be prepared by hydrolyzing and condensing methyldichlorosilane. Products within the scope of Formula 6 can be prepared by cohydrolyzing and cocondensing a mixture of two or more chlorosilanes, at least one of which contains a silicon-bonded hydrogen atom. For example, compounds within the scope of Formula 6 can be prepared by the cohydrolysis and cocondensation of one or more members selected from the class consisting of trimethylchlorosilane, dimethylchlorosilane, methyltrichlorosilane or silicon tetrachloride with one or more members selected from the class consisting of methyldichlorosilane, dimethylchlorosilane, trichlorosilane, dichlorosilane, or methylchlorosilane.

The unsaturated compounds containing olefinic or acetylenic unsaturation which can react with the compounds described above containing the silicon-hydrogen linkage include substantially all of the aliphatically unsaturated compounds known to the art. Thus, the aliphatically unsaturated compound may be a monomeric or polymeric material. The unsaturated compound can contain carbon and hydrogen only, or may also contain any other element. Where the aliphatically unsaturated compound contains an element other than carbon and hydrogen, it is preferred that the other element be oxygen, a halogen, nitrogen or silicon or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the hydrocarbon is one having no more than 20 to 30 carbon atoms in the chain.

Included among the oxygen-containing unsaturated compounds which can be employed in the practice of the present invention are methylvinyl ether, divinyl ether, phenylvinyl ether, the monoallyl ether of ethylene glycol, allyl aldehyde, methylvinyl ketone, phenylvinyl ketone, acrylic acid, methacrylic acid, methylacrylate, phenylmethacrylate, vinylacetic acid, vinyloctoate, vinylacetate, oleic acid, linoleic acid, etc. Unsaturated compounds applicable in the process of the present invention also include acyclic and heterocyclic materials containing aliphatic unsaturation in the ring. Included within this class of compounds are, for example, cyclohexene, cycloheptene, cyclopentadiene, dihydrofuran, dihydropyrene, etc.

The sulfur analogs of any of the unsaturated oxygen-containing materials can also be employed in the practice of the present invention. In addition to compounds containing carbon, hydrogen and oxygen, compounds containing other elements can also be employed. Thus, halogenated derivatives of any of the materials described above can be employed including the acyl chlorides as well as compounds containing a halogen substituent on a carbon atom other than a carbonyl carbon atom. Thus, applicable halogen-containing materials include, for example, vinylchloride, the vinylchlorophenyl esters, the allyl ester of trichloroacetic acid, etc.

Other types of unsaturated materials useful in the practice of the present invention include unsaturated materials containing nitrogen substituents such as acrylonitrile, allyl cyanide, nitroethylene, etc.

The unsaturated compounds useful in the practice of the present invention also include polymeric materials containing aliphatic unsaturation such as the polyester resins prepared from polybasic saturated or unsaturated acids with polyhydric unsaturated alcohols, and the polyester resins prepared by reacting unsaturated polybasic acids with saturated polyhydric alcohols. Thus, a suitable polyester is one prepared by condensing maleic acid with ethylene glycol.

One of the particularly useful types of unsaturated compound which can be employed in the practice of the present invention are those compounds containing silicon, such as the materials commonly referred to as organosilicon monomers or polymers. The scope of the organosilicon compounds which are applicable to the process of the present invention is identical to the scope of the silicon-hydrogen compounds useful in the practice of the present invention. The unsaturated organosilicon compounds are identical to the silicon-hydrogen compounds except that the silicon-bonded hydrogen atom is substituted with a silicon-bonded organic radical containing at least one pair of aliphatic carbon atoms linked with multiple bonds. Preferably, these organosilicon compounds are free of silicon-bonded hydrogen atoms, but it is also possible to employ organosilicon compounds containing both silicon-bonded hydrogens and silicon-bonded radicals containing silicon-bonded aliphatically unsaturated radicals. The only requirement of these unsaturated organosilicon compounds is that there be at least one aliphatically unsaturated organic radical attached to silicon per molecule. Thus, the aliphatically unsaturated organosilicon compounds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the momomeric silanes having the formula:

(7)     $(Y)_m(Y')_n Si(X)_{4-m-n}$ where X is as previously defined, Y is a monovalent hydrocarbon radical of the scope previously defined for R, Y' is an organic radical containing at least one pair of aliphatic carbon atoms attached by multiple bonds, $m$ is equal to from 0 to 3, inclusive, $n$ is equal to from 1 to 4, inclusive, and the sum of $m$ plus $n$ is equal to from 1 to 4, inclusive.

A second class of preferred unsaturated organosilicon compounds are those cyclopolysiloxanes having the formula:

(8)     $(YY'SiO)_d$ where Y and Y' and $d$ are as previously defined. The third group of unsaturated organic silicon compounds preferred in the practice of the present invention are those having the formula:

(9)     $(Y)_e(Y')_f SiO_{\frac{4-e-f}{2}}$ where Y, Y', $e$ and $f$ are as previously defined.

All of the organic silicon compounds within the scope of Formulae 7, 8, and 9 are well known in the art and are prepared by conventional methods. Included among the organic silicon compounds within the scope of Formulae 7, 8, and 9 are the preferred types of material in which Y is methyl or a mixture of methyl and phenyl and in which Y' is an alkenyl radical, preferably vinyl or allyl.

Within the scope of Formula 7 are silanes such as methylvinyldichlorosilane, vinyltrichlorosilane, allyltrichlorosilane, methylphenylvinylchlorosilane, phenylvinyldichlorosilane, diallyldichlorosilane, vinyl-beta-cyanothyldichlorosilane, etc. Included among the cyclic products within the scope of Formula 8 are, for example, the cyclic trimer of methylvinylsiloxane, the cyclic pentamer of methylvinylsiloxane, the cyclic tetramer of methylvinylsiloxane, the cyclic tetramer of vinylphenylsiloxane, etc.

Included within the scope of Formula 9 are the broad class of well known organopolysiloxanes which can be resinous materials, low viscosity fluids, or high molecular weight gummy materials. These polymeric materials are prepared by the well known method of hydrolysis and condensation of a particular diorganodichlorosilane or by the cohydrolysis and co-condensation of a mixture of several different diorganodichlorosilanes. Thus products within the scope of Formula 8 can be prepared by the hydrolysis and condensation of vinyltrichlorosilane alone, divinyldichlorosilane alone, methylvinyldichlorosilane alone phenylvinyldichlorosilane alone, or by the cohydrolysis and co-condensation of any of the aforementioned vinyl-containing chlorosilanes with one or more monoorganotrichlorosilanes, diorganodichlorosilanes, triorganochlorosilanes, or silicon tetrachloride. While the hydrolysis and cohydrolysis above have been described in connection with vinyl-containing organo silicon compounds it should be understood that in place of the vinyl group can be any silicon-bonded organic radical containing at least one pair of aliphatic carbon atoms linked by multiple bonds.

To effect reaction between the silicon-hydrogen containing reactant and the reactant containing aliphatic unsaturation, the two reactants are merely mixed in the desired proportions and the desired amount of catalyst is added, and the reaction mixture is maintained at the desired reaction temperature for a time sufficient to effect the addition of the silicon-hydrogen bond across the multiple bonds of the aliphatically unsaturated compound. The relative amounts of the silicon-hydrogen containing compound and the compound containing multiple bonds can vary within extremely wide limits. In theory, one silicon-hydrogen bond is equivalent to one olefinic double bond or one-half acetylenic triple bond so that this equivalency establishes the general order of magnitude of the two reactants employed. However, for many purposes it can be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrogen linkages available in one reactant per pair of aliphatic carbon atoms linked by double bonds in the other reactant or from about 0.06 to 15 silicon-hydrogen linkages in one reactant per pair of aliphatic carbon atoms linked by triple bonds in the other reactant.

The amount of catalyst of the present invention employed in effecting the addition reaction can vary within extremely wide limits. One of the advantages of the catalyst of the present invention is its high activity in low concentration, such as concentrations of the order of 1 mole of catalyst (providing one mole of platinum) per billion moles of unsaturated groups in the organic compound containing at least one pair of aliphatic carbon atoms linked by multiple bonds. While the platinum-cyclopropane catalyst of the present invention is operative in such minute amounts, the desired addition reaction is generally effected more rapidly with higher concentrations of catalyst. Thus, the concentrations as high as 1 to 10 moles of catalyst per thousand moles of unsaturated groups in the unsaturated compound can be employed. Generally the economics of the reaction dictates the particular level of catalyst employed. The advantage of using low catalyst concentrations includes low catalyst cost and the absence of any substantial amount of catalyst as a contaminant in the final product. The advantage of increased catalyst is increased rate of reaction. In general, it has been found that satisfactory rates of reaction are obtained when the catalyst is used in an amount sufficient to provide one mole of platinum per 1,000 moles unsaturated groups to one mole of catalyst per 1,000,000 moles of aliphatically unsaturated groups in the unsaturated organic compound.

Because the catalyst is employed in such minute quantities it is often desirable to use the catalyst as a solution in a diluent to facilitate uniform dispersion of the catalyst in the reactants. Suitable diluents are any material which is a solvent for the catalyst and which is inert to the reactants under the conditions of the reaction. The preferred diluents are hydrocarbon solvents such as aromatic hydrocarbons, including benzene, toluene and xylene. However, aliphatic solvents such as aliphatic mineral spirits can also be employed. In addition to these carbon solvents the diluent can be an alcohol or ether such as octanol or tetrahydrofuran. Where a diluent is employed, the diluent is employed in an amount equal to from 10 to 10,000 parts by weight diluent per part of the catalyst compound of the present invention.

To effect the addition reactions with the platinum-cyclopropane catalyst, the two reactants and the diluted catalyst are thoroughly mixed and maintained at the reaction temperature for a time sufficient to effect the reaction. Because of the high activity of the catalyst, some degree of reaction often occurs at room temperature as soon as the catalyst is mixed with the reactants. Accordingly, the reaction temperature can be room temperature or even a temperature as low as about 0° C. On the other hand there is no upper limit to the temperature at which the reaction can be run except temperature limitations imposed by the particular reactants and the particular diluent used for the catalyst. Thus, reaction temperatures on the order of 150 to 200° C. can be employed. Preferably, however, the reaction is effected at temperatures in the range of from about 60 to 130° C. The time required for effecting the addition reaction depends upon a number of factors such as the particular reactants employed and the amount of catalyst employed. Thus, reaction times can run from a few minutes up to 12 or more hours depending on reaction conditions.

In some cases, in addition to employing a diluent for the catalyst it is desirable to employ also a solvent for one or both of the reactants. Again the amount of solvent employed in this case is not critical and can vary without limit except for economic considerations. Any solvent can be employed which will dissolve the desired reactant or reactants and which also is inert to the reactants under the conditions of the reaction.

The following examples are illustrative of the practice of my invention and are not intended for purposes of limitation. All parts are by weight.

*Example 1*

A catalyst employed in the practice of the present invention was prepared from a platinum-ethylene complex by reacting the platinum-ethylene complex with cyclopropane. The platinum-ethylene complex was prepared by dissolving 250 parts of $K_2PtCl_4$ in 130 parts of 4 percent aqueous hydrochloric acid in a pressure vessel. After flushing the vessel with nitrogen, the reaction vessel was connected to a source of ethylene and subjected to a continuous ethylene pressure of about 45 p.s.i. for 36 hours. The reaction mixture was then placed in a vacuum desiccator containing sulfuric acid and potassium hydroxide pellets and maintained under vacuum to evaporate the solvent. The resulting crystals were then dissolved in 4 percent alcoholic hydrochloric acid and undissolved material was removed by filtration. The filtrate was then pumped under vacuum at room temperature to remove all liquids. This resulted in a platinum-ethylene complex having the formula:

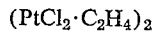

$$(PtCl_2 \cdot C_2H_4)_2$$

The identity of this material was confirmed by chemical analysis which showed the presence of 24.9 percent chlorine as compared with the theoretical value of 24.1 percent chlorine. Approximately 50 parts of the platinum-ethylene complex was dissolved in 2,000 parts chloroform and cyclopropane was bubbled through the solution at room temperature and atmospheric pressure for 2.5 hours. At the end of this time the chloroform solvent was removed by vacuum and the resulting residue was dissolved in 1,000 parts acetic anhydride. Cyclopropane was then bubbled through this acetic anhydride solution for 1 hour at room temperature and atmospheric pressure. The acetic anhydride was pumped from the solution to yield a crystalline material which was washed repeatedly with benzene. The crystals were then dried in a vacuum desiccator containing sulfuric acid and potassium hydroxide pellets. The dried crystalline residue was a light tan material which was the platinum-cyclopropane complex corresponding to Formula 2. The identity of this material was confirmed by elemental analysis which showed the presence of 20.3 percent chlorine as compared with the theoretical value of 20.4 percent chlorine.

*Example 2*

Amyl trichlorosilane was prepared by reacting equimolar amounts of trichlorosilane with pentene-1 in the presence of a sufficient amount of the platinum-cyclopropane complex of Formula 2 to provide $1 \times 10^{-5}$ moles of platinum per mole of the pentene-1. The complex was employed as a solution formed by adding 0.0308 gram of the complex to 10 milliliters of benzene. The benzene solution of the platinum-cyclopropane complex was dissolved in the trichlorosilane and the pentene-1 was added dropwise at a rate sufficient to bring the exothermic reaction to a temperature of about 70° C. At this time the reaction mixture was heated to about 170° C. and maintained at this temperature for 6 hours. The reaction mixture was then fractionally distilled to produce a 92 percent yield of amyl trichlorosilane having a boiling point of 169–172° C.

*Example 3*

A silicone rubber compound was prepared by mixing a trimethylsilyl chain-stopped polydiorganosiloxane having a viscosity in excess of 10,000,000 centipoise at 25° C. and containing 0.2 mole percent methylvinylsiloxane units, 2 mole percent diphenylsiloxane units, with the remaining diorganosiloxane units being dimethylsiloxane units. 500 parts of this methylphenylvinylpolysiloxane gum was mixed with 200 parts of a finely divided fume silica, 0.90 part of 1,3,5,7-tetramethylcyclotetrasiloxane (methyl hydrogen siloxane tetramer) and a sufficient amount of the platinum-cyclopropane complex of Formula 2 to provide 1 platinum atom per 1300 silicon-bonded vinyl groups. This mixture contained about 1.3 silicon-bonded hydrogen atoms per silicon-bonded vinyl group. The platinum-cyclopropane complex was added as a solution prepared by dissolving 55.0 parts of the solid catalyst of Formula 2 in 100 parts tetrahydrofuran. After milling the ingredients thoroughly the mixture was heated in a mold for 15 minutes at 150° C., post-baked for 1 hour in a circulating air oven at 150° C., and physical properties were then measured. The resulting product was a cured silicone rubber having a Shore A hardness of 30, a tensile strength of 775 p.s.i., an elongation of 1100 percent and a tear strength of 150 pounds per inch.

*Example 4*

By a procedure well known in the art a methylvinylpolysiloxane having a viscosity of about 200 centipoises at 25° C. was prepared, which contained about 1.0 mole percent methylvinylsiloxane units, 1.0 mole percent dimethylvinylsiloxane units and 98 mole percent dimethylsiloxane units. To a portion of this methylvinylpolysiloxane fluid was added sufficient 1,1,3,3-tetramethyldisiloxane to provide 1.6 silicon-bonded hydrogen groups per silicon-bonded vinyl group, and a sufficient amount of the platinum-cyclopropane complex of Formula 2 to provide 1 atom of platinum for every 2700 silicon-bonded vinyl group. The catalyst was added as a solution prepared by dissolving 16.1 parts of the catalyst to 10,000 parts benzene. The resulting catalyzed mixture was heated at 120° C. for 10 minutes, during which time it was converted to a tough transparent gel.

*Example 5*

A dimethylhydrogensilyl chain-stopped dimethylpolysiloxane was prepared which contained 2 mole percent dimethyl hydrogen siloxane units and 98 mole percent dimethylsiloxane units. To a portion of this methyl hydrogen polysiloxane fluid was added a sufficient amount of 1,1,3,3-tetramethyl-1,3-divinyldisiloxane to provide 0.1 mole silicon-bonded hydrogen atoms per mole of silicon-bonded vinyl radicals. The resulting solution was catalyzed by adding a sufficient amount of a solution of 16.1 parts of the platinum-cyclopropane complex of Formula 2 in 10,000 parts benzene to provide 1.0 platinum atom per 100,000 silicon-bonded vinyl groups. The resulting catalyzed mixture was then heated at a temperature of from 110–120° C. for 25 minutes to produce a tough clear cured gel.

Example 6

A polymer was prepared by mixing 5 parts of diphenyldivinylsilane with 5 parts of p-bis(dimethylsilyl)benzene and the platinum-cyclopropane complex employed in the practice of the present invention. The platinum-cyclopropane catalyst was present in an amount sufficient to provide 1 atom of platinum per 100,000 silicon-bonded vinyl groups. The catalyst was dissolved into the diphenyldivinylsilane and the Si—H reactant was added to the resulting solution. The reaction mixture was heated at a temperature of about 140° C. for 3 hours, during which time the initially liquid reaction mixture was converted to a hard clear transparent resin.

While the foregoing examples have illustrated many of the embodiments of the present invention, it should be understood that my invention is directed broadly to the addition of organosilicon compounds containing at least one hydrogen atom attached to silicon per molecule to substantially any organic compound containing aliphatic carbon atoms linked by multiple bonds in the presence of the platinum-cyclopropane complex previously described. The process of the present invention provides a method for the production of valuable materials which are useful per se and in some cases materials which are useful as intermediates in the production of more complicated products. For example, the amyltrichlorosilane prepared in Example 2 is useful in the preparation of resinous organopolysiloxanes which are adapted for rendering masonry surfaces water-repellent. The use of the process of the present invention provides a method of converting low molecular weight fluid organopolysiloxanes to solid cured materials. As such, the mixture of low molecular weight materials, such as the mixtures shown in Examples 4 and 5, can be cast about an object such as an electronic component and then heated to form an encapsulated material. The process illustrated in Example 2 provides a useful method for curing fabricated silicone rubber articles in the desired shape.

What I claim as new and desire to secure by Letters Patent of the United States is:

1. A process for the production of organosilicon compositions containing silicon-carbon bonds which comprises contacting a silicon compound containing at least one hydrogen atom attached to silicon per molecule, there being not more than two hydrogen atoms attached to any one silicon atom, with a compound containing aliphatic carbon atoms linked by multiple bonds in the presence of a platinum-cyclopropane complex having the formula:

$$(PtCl_2 \cdot C_3H_6)_2$$

2. A process for the production of organosilicon compositions containing carbon-silicon bonds which comprises contacting a silicon compound containing at least one hydrogen atom attached to silicon per molecule, there being not more than two hydrogen atoms attached to any one silicon atom in said silicon compound, with a compound containing olefinic unsaturation in the presence of a platinum cyclopropane complex having the formula:

$$(PtCl_2 \cdot C_3H_6)_2$$

3. A process for the production of organosilicon compositions containing carbon-silicon bonds which comprises contacting a silicon compound having the formula:

$$(R)_a Si(H)_b (X)_{4-a-b}$$

with a compound containing aliphatic carbon atoms linked by multiple bonds in the presence of a platinum-cyclopropane complex having the formula:

$$(PtCl_2 \cdot C_3H_6)_2$$

where X is a member selected from the class consisting of halogen, —OR radicals and —OOCR radicals, R is a member selected from the class consisting of monovalent hydrocarbon radicals, halogenated monovalent hydrocarbon radicals and cyanoalkyl radicals, $a$ has a value of from 0 to 3, inclusive, $b$ has a value of from 1 to 2, inclusive, and the sum of $a$ plus $b$ is equal to from 1 to 4, inclusive.

4. A process for the production of organosilicon compositions containing silicon-carbon bonds which comprises contacting an organopolysiloxane having the formula:

$$(R)_e Si(H)_f O_{4-e-f}$$

with a compound containing aliphatic carbon atoms linked by multiple bonds in the presence of a platinum-cyclopropane complex having the formula:

$$(PtCl_2 \cdot C_3H_6)_2$$

where R is a member selected from the class consisting of monovalent hydrocarbon radicals, halogenated monovalent hydrocarbon radicals and cyanoalkyl radicals, $e$ has a value of from 0.5 to 2.49, $f$ has a value of from 0.001 to 1.0 and the sum of $e$ plus $f$ is equal to from 1.0 to 2.5.

5. The process for the production of organosilicon compositions containing carbon-silicon bonds which comprises contacting a silicon compound having the formula:

$$(R)_e Si(H)_f O_{4-e-f}$$

with an unsaturated organic silicon compound having the formula:

$$(Y)_e (Y')_f SiO_{\frac{4-e-f}{2}}$$

where R and Y represent members selected from the class consisting of monovalent hydrocarbon radicals, halogenated monovalent hydrocarbon radicals and cyanoalkyl radicals, Y' is an organic radical containing at least one pair of aliphatic carbon atoms linked by multiple bonds, $e$ has a value of from 0.5 to 2.49, $f$ has a value of from 0.001 to 1.0, and the sum of $e$ plus $f$ is equal to from 1.0 to 2.5.

References Cited in the file of this patent

UNITED STATES PATENTS

| | | |
|---|---|---|
| 2,823,218 | Speier | Feb. 11, 1958 |
| 2,915,497 | Clark | Dec. 1, 1959 |
| 2,970,150 | Bailey | Jan. 31, 1961 |